Figure 1:
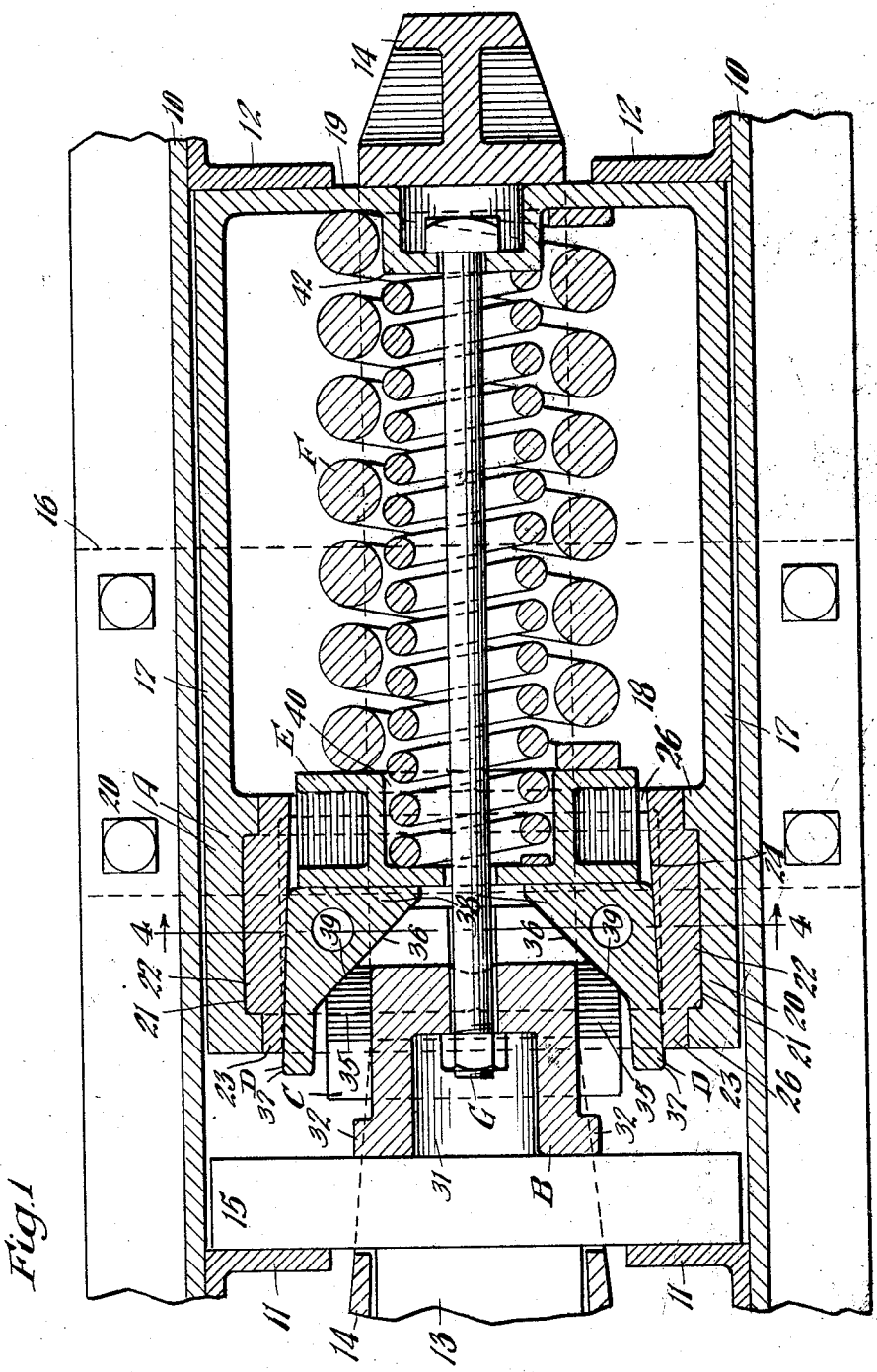

Feb. 28, 1933.   J. F. O'CONNOR   1,899,522
FRICTION SHOCK ABSORBING MECHANISM
Filed Oct. 30, 1929    2 Sheets-Sheet 2
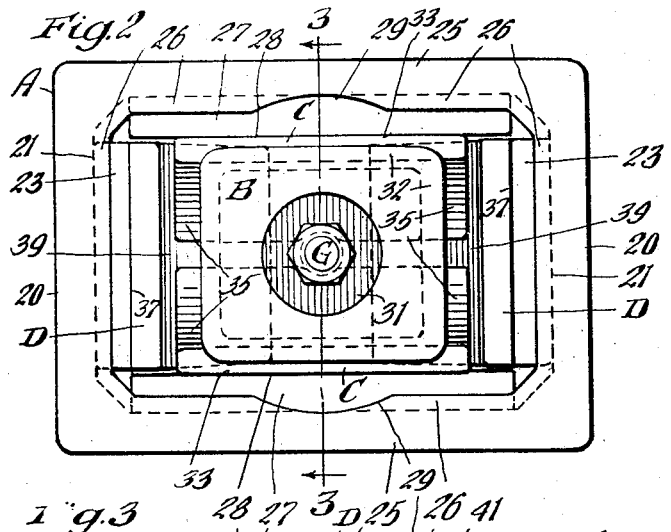
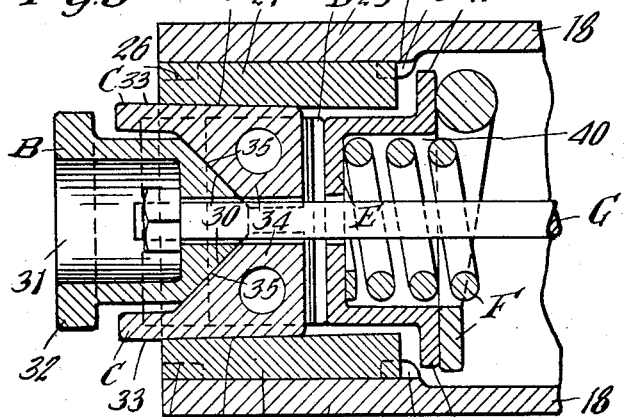
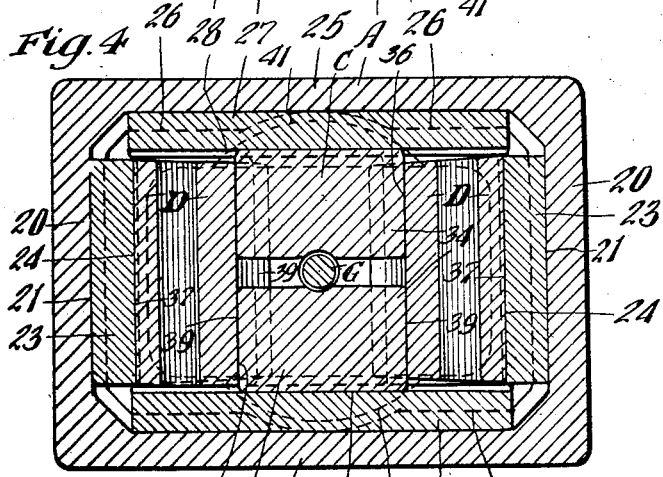
Witness
Wm. Geiger
Inventor
John F. O'Connor
By Joseph Harris
his Atty.

Patented Feb. 28, 1933

1,899,522

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

FRICTION SHOCK ABSORBING MECHANISM

Application filed October 30, 1929. Serial No. 403,412.

This invention relates to improvements in friction shock absorbing mechanisms.

One object of the invention is to provide a friction shock absorbing mechanism having exceptionally high capacity combined with assured release, wherein the high capacity is produced by a plurality of friction shoes cooperating with the walls of a friction shell, the arrangement being such that the interior surfaces of all of the walls of the shell are utilized as friction surfaces.

Another object of the invention is to provide a friction shock absorbing mechanism including a plurality of pairs of friction shoes cooperating with opposed sets of interior friction surfaces of a friction shell, wherein contact of all the shoes with the friction surfaces of the shell is assured by providing means for spreading each pair of shoes apart and forcing the same against the shell friction surfaces independently of the other shoes.

A more specific object of the invention is to provide a friction shock absorbing mechanism including a friction casing of the rectangular type having interior surfaces on the opposed walls thereof, and a pair of shoes cooperating with each set of opposed friction surfaces, wherein true surface contact is assured between the friction surfaces of all of the shoes and the casing, by providing wedge means for forcing the shoes of one pair apart, directly against the cooperating surfaces of the shell, and providing wedging engagement between the pairs of shoes referred to and a second pair of shoes to spread the latter apart independently of the wedging action of the wedge means which cooperates with the first pair of shoes.

Other objects of the invention will more clearly appear from the description and claims hereinafter following.

In the drawings, forming a part of this specification, Figure 1 is a horizontal, longitudinal sectional view through the underframe structure of a railway car, illustrating my improvements in connection therewith. Figure 2 is a front end elevational view of the shock absorbing mechanism proper illustrated in Figure 1. Figure 3 is a vertical, longitudinal sectional view of the forward end portion of the shock absorbing mechanism, corresponding substantially to the line 3—3 of Figure 2. And Figure 4 is a vertical, transverse sectional view, corresponding substantially to the line 4—4 of Figure 1.

In said drawings, 10—10 indicate channel-shaped center or draft sills of a railway car underframe structure to the inner sides of which are secured front stop lugs 11—11 and rear stop lugs 12—12. The inner end portion of the usual coupler shank is indicated by 13 and is connected to a yoke member 14 of well known form. My improved shock absorbing mechanism proper and a front main follower 15 are disposed within the yoke, the yoke being operatively supported by a detachable saddle plate 16 secured to the bottom flanges of the draft sills 10.

My improved shock absorbing mechanism comprises broadly a friction casing or shell A, a wedge block B; two pairs of friction shoes C—C and D—D; a spring follower E; a main spring resistance F; and a retainer bolt G.

The friction casing or shell A is preferably of rectangular cross section and in the form of a box-like member as clearly shown in Figures 1, 2 and 4. The casing or shell A is in the form of a casting having longitudinally disposed spaced vertical side walls 17—17, horizontally disposed, spaced, longitudinally extending top and bottom walls 18—18 and a transverse rear vertical end wall 19. The end wall 19 cooperates with the stop lugs 12 in the manner of the usual rear follower. As most clearly shown in Figure 1, the side walls have thickened sections 20—20 at the forward ends thereof, the thickened sections being provided with pockets or seats 21 adapted to accommodate enlargements 22—22 on a pair of liners 23—23 provided on the side walls of the casing. As most clearly illustrated in Figure 1, the liners 23 are provided with opposed interior, plane friction surfaces 24—24 which converge inwardly of the mechanism.

The top and bottom walls 18 of the casing are also thickened at the forward ends as indicated at 25—25 and most clearly shown in Figure 3. At the front and rear ends of the thickened portions, the walls 18 are provided with interior, transverse spaced ribs 26—26, the spaced ribs providing a pocket therebetween adapted to receive projections on liners 27—27 mounted on said walls. The liners 27 have interior friction surfaces 28 which are also preferably converged inwardly of the mechanism. As will be evident, the enlargements on the liners 23 and the enlargements or projections on the liners 27 hold these liners assembled with the friction casing and prevent relative movement of the liners lengthwise with respect to the casing. The two sets of liners together define the friction shell section proper of the casing A. As most clearly shown in Figures 2 and 4, the transverse ribs 26—26 are centrally cut away as indicated at 29—29 to provide clearance for assembling the main spring resistance and spring follower with the casing, as hereinafter more clearly pointed out.

The wedge block B has a flat, transverse outer end face which bears directly on the inner side of the main follower 15. At the inner end the wedge block B is provided with top and bottom inwardly converging wedge faces 30—30. The wedge block is provided with a pocket 31 to accommodate the nut on the outer end of the retainer bolt G and has the section thereof which is provided with the wedge faces reduced in width and height, as clearly shown in Figures 1 and 3, thereby providing top, bottom and side flanges 32 of relatively great thickness at the outer end thereof.

The two pairs of friction shoes C—C and D—D cooperate with two opposed sets of interior friction surfaces of the casing A, the shoes C—C cooperating with the friction surfaces of the liners 27 on the top and bottom walls of the casing and the shoes D—D cooperating with the friction surfaces of the liners 23 mounted on the side walls of the casing. The friction shoes C—C are of similar design, each being provided with a longitudinally extending friction surface 33 on the outer side thereof which cooperates with the friction surfaces 28 of the liner 27 at the corresponding side of the casing. On the inner side, each shoe C is laterally enlarged as indicated at 34, the enlarged section 34 being provided with a wedge face 35 which cooperates with the wedge face 30 at the same side of the wedge block B. At the inner end each friction shoe C is provided with inwardly converging wedge faces 36—36 at opposite sides thereof, the wedge faces 36 being opposed respectively to the friction surfaces of the liners 23 associated with the side walls 17 of the casing and being disposed angularly to said friction surfaces. As will be evident, each shoe C is thus provided with a set of converging wedge faces at the inner end thereof, the wedge faces of one shoe being located respectively in planes coincident with the wedge faces at the inner end of the other shoe. In other words, the wedge faces of one shoe form continuations of the wedge faces of the other shoes, but are spaced therefrom laterally corresponding to the spacing between the shoes.

The friction shoes D—D are also of similar design, each having a longitudinally disposed flat friction surface 37 on the outer side thereof which cooperates with the friction surfaces 24 of the liner 23 at the corresponding side of the casing. Each shoe D is provided with a lateral enlargement 38 on the inner side thereof having an inner wedge face 39 adapted to engage the wedge faces 36—36 of the shoes C at the corresponding side of the mechanism. The inner ends of the shoes D—D are provided with flat faces which bear directly on the forward side of the spring follower E.

The spring follower E is preferably in the form of a casting having a flat front end face bearing directly on the inner ends of the shoes D—D and a flat face at the inner end cooperating with the forward end portion of the spring resistance F. The spring follower is also provided with a rearwardly opening pocket 40 for a purpose hereinafter pointed out. The spring follower E is suitably reinforced by webs as clearly indicated in Figures 1 and 3 of the drawings. At the top and bottom sides, at the inner end, the spring follower is provided with protruding curved wall sections 41—41 adapted to form a bearing for the top and bottom portions of the spring resistance F. The projecting wall portions 41—41 are of such dimensions that they will pass through the cut away portions 29—29 of the ribs 26—26 on the top and bottom walls of the casing A.

The spring resistance E comprises a light inner coil and a relatively heavier outer coil, the outer coil bearing directly on the spring follower E and the rear end wall 19 of the casing, and the inner coil having the rear end thereof bearing on a hollow boss 42 projecting inwardly from the rear wall 19 of the casing, and having the front end thereof seated within the pocket 40 of the spring follower E and bearing on the front end wall of said pocket.

The mechanism is held assembled and of uniform over-all length by the retainer bolt G which has the head thereof anchored within the hollow boss 42 at the rear end of the casing and the nut thereof disposed within the pocket 31 provided in the wedge block B, the shank of the bolt extending through an opening provided in the spring follower, cut away portions on the inner sides of the shoes C—C and an opening in the wedge block B.

In assembling my improved shock absorbing mechanism, the spring resistance F and the spring follower E are first inserted within the casing A, the cut away sections 29—29 of the ribs at the top and bottom of the casing providing clearance for the insertion of these parts. The friction shoes D—D and the friction shoes C—C are then placed within the front end of the casing and the wedge block B inserted between the shoes C, the parts being then anchored to the casing by applying the retainer bolt G.

In the operation of my improved friction shock absorbing mechanism, both during buff and draft, the main follower 15 and the casing A will be moved relatively toward each other, the main follower being moved inwardly toward the casing by the coupler shank 13 during buff while the casing is held stationary by engagement with the stop lugs 12, and the casing being pulled outwardly by the yoke 14 in draft, while the main follower 15 is held stationary by engagement with the stop lugs 11. During relative movement of the main follower 15 and the casing A, the wedge block B will be forced inwardly of the casing, thereby setting up a wedging action between the same and the shoes C—C, spreading the latter apart and forcing the same into intimate contact with the friction surfaces of the casing while carrying the same inwardly along these friction surfaces. As the friction shoes C—C are forced inwardly, a wedging action will be set up between the same and the shoes D—D, forcing the latter apart against the friction surfaces at opposite sides of the shell and also carrying the same inwardly of the shell, resisted by the action of the main spring F. Due to the converging relation of the opposed friction surfaces of each set of the shell, a differential action will be set up between the shoes C and D, the shoes D slipping on the wedge faces of the shoes C, and the shoes C slipping laterally on the wedge faces of the shoes D. Due to the differential action, the spring follower E will be advanced at a greater rate than the rate of movement of the wedge block B, thus producing compression of the main spring resistance to a corresponding extent. The compression of the mechanism will be limited by engagement of the main follower 15 with the front end of the casing A, whereupon the force will be transmitted through the casing to the corresponding stop lugs of the draft sills, the casing acting as a solid column load-transmitting member at this time and relieving the main spring resistance from excessive compression.

When the actuating force is reduced in release of the mechanism, the expansive action of the main spring resistance F will force the friction shoes D—D and C—C outwardly, carrying the wedge block B therewith, until outward movement of the latter is positively arrested by the retainer bolt G. The parts will thus be restored to the normal full release position illustrated in Figure 1 of the drawings.

From the preceding description taken in connection with the drawings, it will be evident that by the arrangement of friction shoes and wedge means provided full and true frictional contact between the friction surfaces of all of the shoes and the friction surfaces of the casing is assured, the wedge member B acting independently of the shoes D to spread apart the friction shoes C, and the friction shoes D being spread apart independently of the wedging action of the wedge member B and forced against the friction surfaces at the corresponding sides of the shell. A distinct advantage is thus obtained over shock absorbing mechanisms of the rectangular friction shell type having two pairs of shoes cooperating with the opposed sets of friction surfaces thereof, wherein a single wedge member cooperates with all the friction shoes because any irregularity in the formation of the wedge faces of the mechanism, due to unavoidable manufacturing conditions, would cause the wedging action of the wedge block to be unequally applied to the two sets of shoes, thus forcing some of the shoes into tight frictional engagement with the friction surfaces of the shell, while others of the shoes would not have contact with the corresponding friction surfaces. In my improved arrangement, the wedging means acting independently on the two pairs of shoes, the wedging of one pair of shoes into frictional engagement with the shell friction surfaces does not have any influence on the action of the remaining shoes, thus permitting proper operation of the same to produce the desired frictional contact between the friction surfaces thereof and the friction surfaces of the shell.

It is further pointed out that by the arrangement of friction shoes and cooperating wedge faces provided thereon, release of the mechanism is assured in that one set of friction shoes, that is the friction shoes C, are permitted to separate laterally on the wedge faces of the shoes D when the releasing action is initiated, thus breaking the contact between these wedge faces and permitting the shoes C—C to drop away from the shoes D—D.

It will be evident that by providing the rectangular type of shell with opposed friction surfaces on the opposite side walls thereof, the maximum amount of frictional area of the shell is utilized and further that by providing the separately acting pairs of shoes frictional contact is provided between each shoe and the corresponding shell friction surface, thus assuring a gear of maximum shock absorbing capacity.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction shell of substantially rectangular cross section having interior, inwardly converging opposed friction surfaces; of a wedge member; a pair of friction shoes disposed at opposite sides of said wedge member, each of said shoes and wedge member having cooperating wedge faces, said shoes having frictional engagement with two of said opposed friction surfaces of the shell, each of said shoes having wedge faces on opposite sides thereof, said wedge faces at each side of said pair of shoes lying in a common plane; a second pair of shoes at opposite sides of said first named pair of shoes, each of said second named shoes having a wedge face cooperating with the wedge faces at one side of said first named shoes; and a main spring resistance opposing inward movement of the shoes.

2. In a friction shock absorbing mechanism, the combination with a friction shell having interior friction surfaces; of a wedge pressure transmitting member having a pair of lateral wedge faces at opposite sides inclined with reference to the longitudinal axis of the mechanism; a pair of oppositely disposed friction shoes having friction surfaces coacting with certain of said shell surfaces, wedge faces engaging with the faces of said wedge, and additional wedge faces also inclined to said axis, said additional wedge faces of the shoes being arranged in planes at right angles to one of two longitudinal axial planes of the mechanism intersecting each other at right angles, and said first named wedge faces of the shoes being arranged in planes at right angles to the other longitudinal axial plane; a second pair of friction shoes angularly offset from the first named shoes and having friction surfaces coacting with the remaining shell surfaces and wedge faces coacting with said additional wedge faces of said first named pair of shoes; and a spring resistance opposing inward movement of said second named pair of shoes.

3. In a friction shock absorbing mechanism, the combination with a friction shell of rectangular cross-section having flat interior friction surfaces on opposed walls thereof; of a pair of friction shoes having frictional engagement with two of said shell surfaces; an additional pair of shoes having frictional engagement with the remaining two opposed shell surfaces, said first and second named pairs of shoes having cooperating wedge faces disposed in planes inclined to the friction surfaces with which the first named shoes cooperate, the planes of said faces being at right angles to the friction surfaces with which the second named shoes cooperate; and a pressure transmitting member, said second named pair of shoes and pressure transmitting member having engaging wedge faces, said last named wedge faces being disposed in planes inclined to the friction surfaces with which the second named shoes cooperate.

4. In a friction shock absorbing mechanism, the combination with a friction shell having opposed sets of flat side walls extending lengthwise of the mechanism, one of said opposed sets being perpendicular to a horizontal plane, and the other set being perpendicular to a vertical plane; of a pair of opposed friction shoes cooperating with one of said sets of flat walls, a second pair of friction shoes cooperating with the other set of flat walls, said pairs of shoes having cooperating wedge faces converging inwardly of the mechanism and perpendicular to a horizontal plane; a wedge member having wedge faces at opposite sides thereof having wedging engagement with the other set of shoes, the wedge faces of said wedge being disposed in planes perpendicular to a vertical plane; and spring resistance means opposing inward movement of the shoes.

In witness that I claim the foregoing I have hereunto subscribed my name this 28th day of October, 1929.

JOHN F. O'CONNOR.